US007837549B2

(12) United States Patent
Packes, Jr. et al.

(10) Patent No.: US 7,837,549 B2
(45) Date of Patent: Nov. 23, 2010

(54) SYSTEM AND METHOD FOR AUTOMATED PLAY OF LOTTERY GAMES

(75) Inventors: John M. Packes, Jr., Hawthorne, NY (US); Michael F. Steib, New York, NY (US); Andrew P. Golden, Stamford, CT (US); James A. Jorasch, Stamford, CT (US); Jay S. Walker, Ridgefield, CT (US); Thomas M. Sparico, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/199,405

(22) Filed: Aug. 8, 2005
(Under 37 CFR 1.47)

(65) Prior Publication Data

US 2006/0009275 A1 Jan. 12, 2006

Related U.S. Application Data

(63) Continuation of application No. 09/930,717, filed on Aug. 15, 2001, now Pat. No. 6,964,611, and a continuation-in-part of application No. 09/437,204, filed on Nov. 9, 1999, now Pat. No. 6,244,957, which is a continuation of application No. 08/774,487, filed on Dec. 30, 1996, now Pat. No. 6,012,983.

(60) Provisional application No. 60/225,319, filed on Aug. 15, 2000.

(51) Int. Cl.
*A63F 13/00* (2006.01)

(52) U.S. Cl. .............................. 463/17; 463/42; 463/22

(58) Field of Classification Search .................. 463/17, 463/40–42, 16–20; 709/206
See application file for complete search history.

(56) References Cited

U.S. PATENT DOCUMENTS

| | | | |
|---|---|---|---|
| 4,157,829 | A | 6/1979 | Goldman et al. |
| 4,317,957 | A | 3/1982 | Sendrow |
| 4,467,424 | A | 8/1984 | Hedges et al. |

(Continued)

FOREIGN PATENT DOCUMENTS

| | | | |
|---|---|---|---|
| EP | 0 032 410 | A1 | 7/1981 |

(Continued)

OTHER PUBLICATIONS

"Harrah's Reno Uses Hybrid ISDN to Attract Customers", Viewtext, Mar. 1989, Vo. 10, No. 3, ISSN: 0275-0686.

(Continued)

*Primary Examiner*—Ronald Laneau
*Assistant Examiner*—Ross A. Williams
(74) *Attorney, Agent, or Firm*—Fincham Downs, LLC; Michael D. Downs

(57) ABSTRACT

A method according to one embodiment of the present invention provides for receiving data indicating a request by a player for an automated session, in which the automated session comprises a plurality of lottery outcomes. The method further provides for determining at least one parameter associated with the automated session and for determining at least one lottery outcome. The method also includes providing the at least one lottery outcome based on the at least one parameter.

20 Claims, 11 Drawing Sheets

U.S. PATENT DOCUMENTS

| | | | | |
|---|---|---|---|---|
| 4,494,197 | A | 1/1985 | Troy et al. | |
| 4,531,187 | A | 7/1985 | Uhland | 364/412 |
| 4,652,998 | A | 3/1987 | Koza et al. | |
| 4,669,731 | A | 6/1987 | Clarke | 273/143 R |
| 4,689,742 | A | 8/1987 | Troy et al. | |
| 4,698,564 | A | 10/1987 | Slavin | 318/257 |
| 4,755,941 | A | 7/1988 | Bacchi | 364/412 |
| 4,760,527 | A | 7/1988 | Sidley | |
| 4,764,666 | A | 8/1988 | Bergeron | |
| 4,837,728 | A | 6/1989 | Barrie et al. | 463/27 |
| 4,842,278 | A | 6/1989 | Markowicz | |
| 4,856,787 | A | 8/1989 | Itkis | |
| 4,880,237 | A | 11/1989 | Kishishita | |
| 4,951,039 | A | 8/1990 | Schwendeman et al. | 345/473 |
| 4,982,337 | A | 1/1991 | Burr et al. | |
| 4,991,848 | A | 2/1991 | Greenwood et al. | 273/143 R |
| 5,038,022 | A | 8/1991 | Lucero | |
| 5,042,809 | A | 8/1991 | Richardson | 273/138 |
| 5,069,453 | A | 12/1991 | Koza et al. | 463/17 |
| 5,083,271 | A | 1/1992 | Thacher et al. | 364/411 |
| 5,096,195 | A | 3/1992 | Gimmon | 273/138 |
| 5,112,050 | A | 5/1992 | Koza et al. | 463/17 |
| 5,119,295 | A | 6/1992 | Kapur | 364/412 |
| 5,123,649 | A | 6/1992 | Tiberio | 273/143 R |
| 5,178,390 | A | 1/1993 | Okada | 273/143 R |
| 5,179,517 | A | 1/1993 | Sarbin et al. | 364/410 |
| 5,223,698 | A | 6/1993 | Kapur | |
| 5,239,165 | A | 8/1993 | Novak | |
| 5,275,400 | A | 1/1994 | Weingardt et al. | 273/999 |
| 5,276,312 | A | 1/1994 | McCarthy | |
| 5,277,424 | A | 1/1994 | Wilms | |
| 5,283,734 | A | 2/1994 | Von Kohorn | |
| 5,287,269 | A | 2/1994 | Dorrough et al. | 364/408 |
| 5,290,033 | A | 3/1994 | Bittner et al. | 463/25 |
| 5,324,035 | A | 6/1994 | Morris et al. | |
| 5,330,185 | A | 7/1994 | Wells | |
| 5,377,975 | A | 1/1995 | Clapper | 463/16 |
| 5,380,007 | A | 1/1995 | Travis et al. | |
| 5,393,057 | A | 2/1995 | Marnell, II | 463/13 |
| 5,398,932 | A | 3/1995 | Eberhardt et al. | |
| 5,401,024 | A | 3/1995 | Simunek | |
| 5,413,357 | A | 5/1995 | Schulze et al. | 463/5 |
| 5,415,416 | A | 5/1995 | Scagnelli et al. | |
| 5,417,424 | A | 5/1995 | Snowden et al. | |
| 5,429,361 | A | 7/1995 | Raven et al. | |
| 5,436,967 | A | 7/1995 | Hanson | |
| 5,470,079 | A | 11/1995 | LeStrange et al. | 463/25 |
| 5,518,253 | A | 5/1996 | Pocock et al. | |
| 5,536,008 | A | 7/1996 | Clapper | 463/16 |
| 5,551,692 | A | 9/1996 | Pettit et al. | |
| 5,564,700 | A | 10/1996 | Celona | |
| 5,569,082 | A | 10/1996 | Kaye | 463/17 |
| 5,570,885 | A | 11/1996 | Ornstein | |
| 5,580,311 | A | 12/1996 | Haste, III | 463/17 |
| 5,586,936 | A | 12/1996 | Bennett et al. | 463/25 |
| 5,595,538 | A | 1/1997 | Haste, III | 463/17 |
| 5,609,337 | A | 3/1997 | Clapper, Jr. | 273/138.2 |
| 5,613,912 | A | 3/1997 | Slater | 463/25 |
| 5,621,200 | A | 4/1997 | Irwin et al. | 235/375 |
| 5,634,012 | A | 5/1997 | Stefik et al. | 395/239 |
| 5,647,592 | A | 7/1997 | Gerow | 273/139 |
| 5,647,798 | A | 7/1997 | Falciglia | 463/19 |
| 5,651,548 | A | 7/1997 | French et al. | 273/309 |
| 5,657,899 | A | 8/1997 | Stoken | 463/17 |
| 5,697,844 | A | 12/1997 | Von Kohorn | 463/40 |
| 5,707,285 | A | 1/1998 | Place et al. | |
| 5,735,432 | A | 4/1998 | Stoken et al. | 221/2 |
| 5,735,742 | A | 4/1998 | French | 463/25 |
| 5,741,183 | A | 4/1998 | Acres et al. | |
| 5,743,800 | A | 4/1998 | Huard et al. | 463/26 |
| 5,749,784 | A | 5/1998 | Clapper, Jr. | 463/17 |
| 5,758,875 | A | 6/1998 | Giacalone, Jr. | |
| 5,762,552 | A | 6/1998 | Vuong et al. | 463/25 |
| 5,766,075 | A | 6/1998 | Cook et al. | 463/25 |
| 5,768,382 | A | 6/1998 | Schneier et al. | 380/23 |
| 5,770,533 | A | 6/1998 | Franchi | |
| 5,772,509 | A | 6/1998 | Weiss | |
| RE35,864 | E | 7/1998 | Weingardt | 463/28 |
| 5,779,549 | A | 7/1998 | Walker et al. | |
| 5,781,647 | A | 7/1998 | Fishbine | 382/1 |
| 5,788,573 | A | 8/1998 | Baerlocher et al. | |
| 5,803,808 | A | 9/1998 | Strisower | 463/11 |
| 5,816,917 | A | 10/1998 | Kelmer et al. | |
| 5,816,919 | A | 10/1998 | Scagnelli et al. | 463/25 |
| 5,830,063 | A | 11/1998 | Byrne | 463/18 |
| 5,830,067 | A * | 11/1998 | Graves et al. | 463/40 |
| 5,833,538 | A | 11/1998 | Weiss | 463/21 |
| 5,848,932 | A | 12/1998 | Adams | |
| 5,871,398 | A * | 2/1999 | Schneier et al. | 463/16 |
| 5,910,048 | A | 6/1999 | Feinberg | 463/25 |
| 5,915,588 | A | 6/1999 | Stoken et al. | 221/2 |
| 5,919,090 | A | 7/1999 | Mothwurf | 463/25 |
| 5,951,397 | A | 9/1999 | Dickinson | 463/36 |
| 5,970,143 | A | 10/1999 | Schneier et al. | 380/23 |
| 5,980,384 | A | 11/1999 | Barrie | 463/16 |
| 5,999,808 | A | 12/1999 | LaDue | 455/412.2 |
| 6,001,016 | A | 12/1999 | Walker et al. | |
| 6,012,983 | A * | 1/2000 | Walker et al. | 463/20 |
| 6,024,640 | A | 2/2000 | Walker et al. | 463/17 |
| 6,024,643 | A | 2/2000 | Begis | 60/533 |
| 6,050,895 | A | 4/2000 | Luciano, Jr. et al. | 463/7 |
| 6,077,163 | A | 6/2000 | Walker et al. | 463/26 |
| 6,139,430 | A | 10/2000 | Huard et al. | 463/16 |
| 6,146,270 | A | 11/2000 | Huard et al. | 463/12 |
| 6,168,522 | B1 | 1/2001 | Walker et al. | 463/25 |
| 6,193,606 | B1 | 2/2001 | Walker et al. | 463/20 |
| 6,203,428 | B1 | 3/2001 | Giobbi et al. | 463/16 |
| 6,234,900 | B1 | 5/2001 | Cumbers | 463/42 |
| 6,244,957 | B1 * | 6/2001 | Walker et al. | 463/20 |
| 6,270,409 | B1 * | 8/2001 | Shuster | 463/20 |
| 6,273,820 | B1 | 8/2001 | Haste, III | 60/533 |
| 6,315,662 | B1 | 11/2001 | Jorasch et al. | 463/20 |
| 6,318,721 | B1 | 11/2001 | Randall et al. | 273/148 |
| 6,319,127 | B1 | 11/2001 | Walker et al. | 463/26 |
| 6,331,144 | B1 | 12/2001 | Walker et al. | 463/20 |
| 6,343,989 | B1 | 2/2002 | Wood et al. | 463/23 |
| 6,389,538 | B1 | 5/2002 | Gruse et al. | 705/1 |
| 6,402,148 | B1 | 6/2002 | Saruwatari | 273/292 |
| 6,402,614 | B1 | 6/2002 | Schneier et al. | |
| 6,508,709 | B1 | 1/2003 | Karmarkar | 463/42 |
| 6,508,710 | B1 | 1/2003 | Paravia et al. | 463/42 |
| 6,527,638 | B1 | 3/2003 | Walker et al. | 463/25 |
| 6,605,001 | B1 | 8/2003 | Tarantino | 463/22 |
| 6,628,194 | B1 | 9/2003 | Hellebust et al. | |
| 6,634,942 | B2 | 10/2003 | Walker et al. | 463/20 |
| 6,709,331 | B2 | 3/2004 | Berman | |
| 6,722,983 | B2 | 4/2004 | Kaminkow et al. | 463/26 |
| 6,726,563 | B1 | 4/2004 | Baerlocher et al. | 463/25 |
| 6,733,389 | B2 | 5/2004 | Webb et al. | 463/20 |
| 6,769,983 | B2 | 8/2004 | Slomiany | 463/16 |
| 6,896,616 | B2 | 5/2005 | Weiss | 463/20 |
| 6,935,949 | B1 | 8/2005 | Murphy | 463/20 |
| 6,969,317 | B2 | 11/2005 | Walker et al. | 463/40 |
| 7,008,317 | B2 | 3/2006 | Cote et al. | 463/16 |
| 7,140,964 | B2 | 11/2006 | Walker et al. | 463/25 |
| 2001/0039204 | A1 * | 11/2001 | Tanskanen | 463/17 |
| 2002/0022512 | A1 | 2/2002 | Higurashi | 463/20 |
| 2002/0058542 | A1 | 5/2002 | Roethel et al. | 463/13 |
| 2002/0082775 | A1 | 6/2002 | Meadows et al. | 701/214 |
| 2002/0090986 | A1 | 7/2002 | Cote et al. | 463/16 |
| 2002/0112171 | A1 | 8/2002 | Ginter et al. | 713/194 |
| 2002/0143875 | A1 | 10/2002 | Ratcliff, III | 709/205 |
| 2002/0155875 | A1 * | 10/2002 | Levitan | 463/17 |
| 2003/0028480 | A1 | 2/2003 | Rowe | 206/459 |

| | | | | |
|---|---|---|---|---|
| 2003/0144053 | A1 | 7/2003 | Michaelson | 463/25 |
| 2003/0162582 | A1 | 8/2003 | Gordon | 463/20 |
| 2003/0224854 | A1 | 12/2003 | Joao | 463/40 |
| 2005/0014553 | A1 | 1/2005 | Byrne | 463/18 |

FOREIGN PATENT DOCUMENTS

| | | | |
|---|---|---|---|
| EP | 0 106 187 | B1 | 11/1985 |
| EP | 0 405 776 | A2 | 1/1991 |
| EP | 0 478 412 | A1 | 4/1992 |
| EP | 0 487 446 | A2 | 5/1992 |
| FR | 2 697 653 | A1 | 5/1994 |
| FR | 2 815 214 | | 4/2002 |
| GB | 2 121 569 | A | 12/1983 |
| GB | 2 148 135 | A | 5/1985 |
| JP | 01258178 | A | 10/1989 |
| JP | 01269158 | A | 10/1989 |
| JP | 01269164 | A | 10/1989 |
| JP | 01316869 | | 12/1989 |
| JP | 02110660 | A | 4/1990 |
| JP | 03269763 | | 12/1991 |
| JP | 06-35944 | | 2/1994 |
| WO | WO 86/02752 | | 5/1986 |
| WO | WO 92/16914 | | 10/1992 |
| WO | WO 93/19428 | | 9/1993 |
| WO | WO 94/19906 | | 9/1994 |
| WO | WO 95/05876 | | 3/1995 |
| WO | WO 99/42964 | | 8/1999 |
| WO | WO 01/03786 | | 1/2001 |
| WO | WO 01/48712 | | 7/2001 |
| WO | WO 01/69551 | | 9/2001 |
| WO | WO 01/75824 | | 12/2001 |
| WO | WO 02/100494 | A1 | 12/2002 |
| WO | WO 03/017178 | A1 | 2/2003 |
| WO | WO 03/089086 | A1 | 10/2003 |
| WO | WO 03/089090 | A1 | 10/2003 |
| WO | WO 2004/014506 | A1 | 2/2004 |

OTHER PUBLICATIONS

"Agent Speaks Directly to the Customer on the Screen", ISND News, Mar. 1, 1989, vol. 2, No. 4, ISSN: 0899-9554.
Conniff, Michael, "Don't Bet Against Harrah's When it Comes to ISDN", Electronic Service Update, May 1, 1989, vol. 2, No. 5.
Ritchie, Lauren, "Orange Man Sought in Betting Probe", Orlando Sentinel Tribune, May 30, 1990, Section: Local & State, p. B2.
Brochure: "Oasis Electronic Pull-Tab Network", Copyright 1993, Infinational Technologies, Inc.
"Interactive Network (IN) announced Tues . . . ", Communications Daily, Nov. 30, 1994, vol. 14, No. 230, ISSN: 0277-0679.
"Interactive Network Sets Up Gaming Subsidiary", Interactive Facts, Dec. 1994, vol. 1, No. 25.
"Interactive Network Launches Wagering Unit", Multimedia Business Report, Dec. 2, 1994, ISSN: 1065-8300.
"Interactive Network Forms Real-Time Gambling Subsidiary", Newsbyte News Network, Dec. 7, 1994.
Mayo, Michael, "Win-Or-Lose Cruise", Sun Sentinel, Dec. 28, 1994, Section: Sports, p. 1C.
Dvorak, John C., "Gambling on a PC near you.", PC Magazine, May 16, 1995, vol. 14, No. 9, p. 89, ISSN: 0888-8507.
Cave, Kathy, "The Lake Effect", Milwaukee Journal Sentinel, Mar. 27, 1996, Section: News, p. 8.
Website: "Bingo Network Gaming International", Network Gaming International Corp.—Bingo-Links, (http //network-bingo com/bingo htm), Nov. 13, 1996.
Murray, Raphel, "Casinos Gamble On Direct Mail; Atlantic City Casinos; Retail; Industry Overview", Direct Marketing Magazine, Feb. 1992, vol. 54, No. 10, p. 32, ISSN: 0012-3188, 4pp.
Parets, Robyn Taylor, "The Newer Deal", International Gaming and Wagering Business, Apr. 1997, Sec. p. 27, ISSN: 8750-8222, 4pp.
"TLC: The Secret World of Gambling: Casino Surveillance", Copyright 2000, The Discovery Channel, (http // www tlc discover com/ tlcpages/gambling/eyesky thml), 2pp.
"Mimio™ Turns a Dry Erase Board into an Electronic Whiteboard", Dukane Corporation Audio Visual Division, [retrieved in 2002], no URL available, 1pg.
Goosnes, Michael, "Laser Beam and Transpatent Senors", (http // atlas web ern ch atlas TP NEW HTML/tp9new/node253 html).
Website, "Extending the Casino Floor", Game Cast Live, (http // www gamecastlive com/presentation/toronto_files/slide0012 htm), download date: Jun. 6, 2001, l0pp.
Davy, K., "Big Ichigekil Pachi-Slot Taikouryku Universal Museum—Reader Review", Copyright 1995-2001, Game FAQs, 2pp.
"Station Announces Formation of GameCase Live, LLC and Release of Remote Play eSlots for In-Room Gaming Applications", PR Newswire, Jun. 6, 2001, Section: Financial News, 2pp.
Grochowski, John, "Computers Help Learn Winning Strategy", Chicago Sun-Times, Jun. 30, 1995, Section Weekend Plus, Gaming, p. 13, NC, 2pp.
Pledger, Marcia, "Going for the Gold at Slot Tournaments", Las Vages Review-Journal Dec. 24, 1995, p. 5.L., 4pp.
Hawley, David, "Those One-Armed Bandits; Slot Machine Tournaments Lure Throngs to Midwest Casinos", The Houston Chronicle, Apr. 9, 1996, Section: Houston, p. 3.
Grochowski, John, "Slot Tourney Prospers Under Indiana Rules", Chicago Sun-Times, Apr. 6, 1997, Section: SHO, Casinos, p. 15, NC., 1pg.
Email: "We Have Added a New 'Auto-Spin' Feature . . . ", slotmachine @ searchout com, (http // www searchout com), Sep. 17, 1999, 1pg.
Website: "Bingo—Network Gaming International:", Network Gaming International Corp., (http // network-bingo com/bingo htm), download date: Nov. 13, 1996, 5pp.
Brochure: "Oasis Electronic Pull-Tab Network", Copyright 1993 Infinational Technologies, Inc., 9pp.
Office Action for U.S. Appl. No. 10/635,986, dated Feb. 29, 2008, 9pp.
Office Action for U.S. Appl. No. 11/424,000, dated Sep. 21, 2007, 4pp.
Notice of Allowability for U.S. Appl. No. 11/424,000, dated Feb. 20, 2008, 3pp.
Notice of Allowability for U.S. Appl. No. 11/424,000, dated Jun. 16, 2008, 4pp.
Office Action for U.S. Appl. No. 11/424,006, dated Apr. 14, 2008, 5pp.
Office Action for U.S. Appl. No. 09/879,299, dated Aug. 29, 2001, 6pp.
Interview Summary for U.S. Appl. No. 09/879,299, dated Sep. 11, 2001, 2pp.
Interview Summary for U.S. Appl. No. 09/879,299, dated Sep. 14, 2001, 3pp.
Office Action for U.S. Appl. No. 09/879,299, dated Apr. 23, 2002, 5pp.
Notice of Allowability U.S. Appl. No. 09/879,299, dated Jun. 13, 2002, 3pp.
Notice of Allowability for U.S. Appl. No. 09/879,299, dated Aug. 14, 2002.
Notice of Allowability for U.S. Appl. No. 09/879,299, dated Apr. 23, 2003, 2pp.
Office Action for U.S. Appl. No. 10/159,722, dated Sep. 24, 2002, 5pp.
Interview Summary for U.S. Appl. No. 10/159,722, dated Nov. 20, 2002, 3pp.
Interview Summary for U.S. Appl. No. 10/159,722, dated Nov. 4, 2002, 4pp.
Interview Summary for U.S. Appl. No. 10/159,722 dated Dec. 4, 2002, 3pp.
Office Action for U.S. Appl. No. 10/159,722, dated Feb. 24, 2004, 8pp.
Interview Summary for U.S. Appl. No. 10/159,722, dated May 6, 2004, 3pp.
Notice of Allowability for U.S. Appl. No. 10/159,722, dated Nov. 30, 2004, 4pp.
Notice of Allowability for U.S. Appl. No. 10/159,722, dated Jul. 28, 2005, 4pp.

Office Action for U.S. Appl. No. 11/217,588, dated Jan. 12, 2007, 14pp.
Office Action for U.S. Appl. No. 11/217,588, dated Sep. 26, 2007, 11pp.
Notice of Allowability for U.S. Appl. No. 11/217,588, dated Nov. 19, 2007, 2pp.
Notice of Allowability for U.S. Appl. No. 11/217,588, dated Jun. 13, 2008, 2pp.
Office Action for U.S. Appl. No. 08/774,487, dated Dec. 22, 1998, 6pp.
Notice of Allowability for U.S. Appl. No. 08/774,487, dated Jul. 19, 1999, 1pg.
Office Action for U.S. Appl. No. 09/437,204, dated Jun. 21, 2000, 8pp.
Notice of Allowability for U.S. Appl. No. 09/437,204, dated Jan. 29, 2001, 3pp.
Office Action for U.S. Appl. No. 10/681,075, dated Oct. 13, 2004, 17pp.
Interview Summary for U.S. Appl. No. 10/681,075, dated Dec. 27, 2005, 7pp.
Office Action for U.S. Appl. No. 10/681,075, dated Apr. 28, 2006, 13pp.
Office Action for U.S. Appl. No. 10/681,075, dated Oct. 27, 2006, 15pp.
Office Action for U.S. Appl. No. 10/681,075, dated Oct. 30, 2007, 13pp.
Office Action for U.S. Appl. No. 10/681,075, dated May 15, 2007, 15pp.
Advisory Action for U.S. Appl. No. 10/681,075, dated Aug. 24, 2007, 2pp.
Office Action for U.S. Appl. No. 10/681,520, dated Oct. 9, 2007, 10pp.
Office Action for U.S. Appl. No. 11/423,037, dated Jan. 25, 2008, 6pp.
Office Action for U.S. Appl. No. 11/423,037, dated Jun. 20, 2007, 8pp.
Office Action for U.S. Appl. No. 11/423,043, dated May 28, 2008, 6pp.
Office Action for U.S. Appl. No. 10/331,438, dated May 3, 2006, 6pp.
Office Action for U.S. Appl. No. 10/331,438, dated Jun. 20, 2006, 6pp.
Office Action for U.S. Appl. No. 10/331,438, dated Apr. 4, 2007, 14pp.
Office Action for U.S. Appl. No. 10/331,438, dated Dec. 21, 2007, 13pp.
Office Action for U.S. Appl. No. 11/462,756, dated Mar. 25, 2008, 6pp.
Office Action for U.S. Appl. No. 11/462,850, dated Mar. 14, 2008, 5pp.
Office Action for U.S. Appl. No. 11/428,599, dated Apr. 17, 2007, 4pp.
Office Action for U.S. Appl. No. 11/428,599, dated Dec. 20, 2007, 7pp.
Office Action for U.S. Appl. No. 11/428,601, dated Apr. 20, 2007, 5pp.
Office Action for U.S. Appl. No. 11/428,601, dated Jan. 8, 2008, 5pp.
Office Action for U.S. Appl. No. 11/428,601, dated Apr. 28, 2008, 8pp.
Office Action for U.S. Appl. No. 11/456,882, dated Mar. 26, 2008, 7pp.
Office Action for U.S. Appl. No. 11/456,758, dated Jun. 12, 2008, 5pp.
Office Action for U.S. Appl. No. 11/456,726, dated Jun. 6, 2008, 7pp.
Office Action for U.S. Appl. No. 09/930,717, dated Sep. 23, 2002, 7pp.
Interview Summary for U.S. Appl. No. 09/930,717, dated Dec. 13, 2002, 3pp.
Office Action for U.S. Appl. No. 09/930,717, dated Jul. 16, 2003, 6pp.
Interview Summary for U.S. Appl. No. 09/930,717, dated Oct. 7, 2003, 2pp.
Office Action for U.S. Appl. No. 09/930,717, dated Mar. 31, 2004, 8pp.
Interview Summary for U.S. Appl. No. 09/930,717, dated Aug. 2, 2004, 4pp.
Office Action for U.S. Appl. No. 09/930,717, dated Sep. 23, 2004, 5pp.
Notice of Allowability for U.S. Appl. No. 09/930,717, dated Mar. 18, 2005, 6pp.
Office Action for U.S. Appl. No. 08/880,838, Oct. 6, 1999, 4pp.
Notice of Allowability for U.S. Appl. No. 08/880,838, dated Dec. 6, 1999, 1pg.
Office Action for U.S. Appl. No. 09/518,760, dated May 9, 2001, 7pp.
Notice of Allowability for U.S. Appl. No. 09/518,760, dated Aug. 10, 2001, 1pg.
Office Action for U.S. Appl. No. 10/420,066, dated Sep. 22, 2006, 11pp.
Office Action for U.S. Appl. No. 10/420,066, dated Jul. 13, 2007, 12pp.
Office Action for U.S. Appl. No. 10/001,089, dated Sep. 12, 2003, 9pp.
Office Action for U.S. Appl. No. 10/001,089, dated Apr. 6, 2004, 11pp.
Interview Summary for U.S. Appl. No. 10/001,089, dated Aug. 12, 2004, 4pp.
Office Action for U.S. Appl. No. 10/001,089, dated Jul. 11, 2005, 23pp.
Notice of Allowability for U.S. Appl. No. 10/001,089, dated Jun. 28, 2006, 7pp.
Office Action for U.S. Appl. No. 10/985,131, dated Nov. 3, 2005, 4pp.
Advisory Action for U.S. Appl. No. 10/681,075, dated Aug. 24, 2007, 2pp.
"Affidavit Under 37 CFR 1.131", for U.S. Appl. No. 10/134,007, entitled "Continuous Play Slot Machine and Retrofit Kit", filed Jan. 4, 2005 in the name of Charles Murphy, 14pp.
U.S. Appl. No. 08/766,576, "Secure Improved Remote Gaming System", filed Dec. 6, 1996.
U.S. Appl. No. 09/218,258, entitled "System and Method for Automatically Initiating Game Play on an Electronic Gaming Device", filed Dec. 6, 1996, 35pp.
Pending U.S. Patent Application entitled: "Methods and Apparatus for Providing Communications Services at a Gaming Machine", Walker et al., U.S. Appl. No. 10/420,118, filed Apr. 21, 2003.
The International Search Report for PCT Application No. PCT/US03/24789, dated Jan. 13, 2004, 7pp.
The International Search Report for PCT Application No. PCT/US03/08540, dated Jun. 19, 2003, 5pp.
Written Opinion for PCT Application No. PCT/US03/08540, dated Jan. 27, 2004, 5pp.
International Preliminary Examination Report for PCT Application No. PCT/US03/08540, dated Sep. 13, 2004, 4pp.
Written Opinion for PCT Application No. PCT/US04/33313, dated, Nov. 8, 2005, 8pp.
The International Search Report for PCT Application No. PCT/US04/33313, dated, Nov. 8, 2005, 4pp.
Supplementary European Search Report for EP 02 75 2846, dated Aug. 24, 2006, 2pp.
The International Search Report for PCT Application No. PCT/US02/26202, dated Oct. 2, 2002, 7pp.
Written Opinion for PCT Application No. PCT/US02/26202, dated Apr. 29, 2003, 6pp.
International Preliminary Examination Report for Application No. PCT/US02/26202, dated Apr. 14, 2004, 4pp.
The International Search Report for PCT Application No. PCT/US03/12271, dated Sep. 15, 2003, 8pp.
The International Search Report for PCT Application No. PCT/US02/14231, dated Jul. 8, 2002, 7pp.
Written Opinion for PCT Application No. PCT/US02/14231, Apr. 7, 2003, 4pp.
International Preliminary Examination Report for PCT Application No. PCT/US02/14231, dated Dec. 1, 2003, 4pp.
The International Search Report for PCT Application No. PCT/US03/24789, dated Jan. 13, 2004, 7pp.
The International Search Report for PCT Application No. PCT/US06/60845, dated Jan. 18, 2008, 5pp.

Written Opinion of the International Searching Authority for PCT Application No. PCT/US06/60845, dated Jan. 18, 2008, 3pp.
Notice of Allowance for U.S. Appl. No. 11/424,000, dated Aug. 8, 2008, 6pp.
Office Action for U.S. Appl. No. 10/636,520, dated Jul. 9, 2008, l4pp.
Office Action for U.S. Appl. No. 11/462,756, dated Jul. 9, 2008, 9pp.
Office Action for U.S. Appl. No. 10/420,066, dated Jan. 8, 2008, 7pp.
Office Action for U.S. Appl. No. 10/681,075, dated Jul. 28, 2008, 15pp.
Office Action for U.S. Appl. No. 11/424,435, mailed Feb. 2, 2010, 12 pp.
Office Action for U.S. Appl. No. 11/462,756, mailed Jan. 6, 2009, 15 pp.
Office Action for U.S. Appl. No. 11/293,016, mailed Jan. 7, 2009, 7 pp.
Office Action for U.S. Appl. No. 10/420,066, mailed Oct. 17, 2008, 10 pp.
Office Action for U.S. Appl. No. 10/681,075, mailed Dec. 29, 2009, 6 pp.
Office Action for U.S. Appl. No. 10/681,075, mailed May 11, 2009, 6 pp.
Office Action for U.S. Appl. No. 10/636,520, mailed Nov. 18, 2009, 13 pp.
Office Action for U.S. Appl. No. 10/636,520, mailed Jan. 15, 2009, 10 pp.
Office Action for U.S. Appl. No. 11/423,037, mailed Dec. 9, 2008, 12 pp.
Office Action for U.S. Appl. No. 11/423,043, mailed Dec. 21, 2009, 9 pp.
Office Action for U.S. Appl. No. 11/423,043, mailed Jul. 20, 2009, 6 pp.
Fallstrom, Bob "Symphony of Trees is sure to be a dazzling delight", Herald & Review, Nov. 17, 1992, 5 pp.
Notice of Allowance for U.S. Appl. No. 10/681,075 mailed Apr. 28, 2010, 6 pp.
Office Action for U.S. Appl. No. 11/424,435 mailed Jan. 23, 2009, 6 pp.
Office Action for U.S. Appl. No. 11/423,043 mailed Jul. 13, 2010, 7 pp.

* cited by examiner

500

| NAME 510 | SOCIAL SECURITY NUMBER 520 | PLAYER ID 530 | ADDRESS 540 | PHONE NUMBER 550 | CREDIT CARD NUMBER 560 | CREDIT BALANCE 570 |
| --- | --- | --- | --- | --- | --- | --- |
| | | | | | | |
| | | | | | | |
| | | | | | | |

FIG. 5

700

| COMMUNICATION DEVICE NUMBER 710 | COMMUNICATOR IDENTIFIER 720 | PLAYER ID 730 | COMMUNICATION TIME OUT 740 | COMMUNICATION TIME IN 750 |
|---|---|---|---|---|
| | | | | |
| | | | | |
| | | | | |

FIG. 7

SYSTEM AND METHOD FOR AUTOMATED PLAY OF LOTTERY GAMES

CROSS-REFERENCE TO RELATED APPLICATIONS

This application is a continuation of U.S. patent application Ser. No. 09/930,717, filed Aug. 15, 2001 and issued as U.S. Pat. No. 6,964,611 on Nov. 15, 2005 entitled "SYSTEM AND METHOD FOR AUTOMATED PLAY OF LOTTERY GAMES"; which (i) claims priority to U.S. Patent Application No. 60/225,319, "SYSTEMS AND METHODS FOR AUTOMATED LOTTERY GAME PLAY" filed Aug. 15, 2000, incorporated herein by reference and (ii) is a continuation-in-part of U.S. patent application Ser. No. 09/437,204, entitled "AUTOMATED PLAY GAMING DEVICE", filed Nov. 9, 1999, and which issued as U.S. Pat. No. 6,244,957 on Jun. 12, 2001; which is a continuation of U.S. patent Ser. No. 08/774,487 U.S. Pat. No. 6,012,983, "AUTOMATED PLAY GAMING DEVICE" filed Dec. 30, 1996 and issued Jan. 11, 2000. Each of the above is incorporated herein by reference.

This application is also related to the following U.S. Patent Applications:

U.S. patent application Ser. No. 11/424,430 filed on Jun. 15, 2006, U.S. patent application Ser. No. 11/424,435 on Jun. 15, 2006 and U.S. patent application Ser. No. 11/424,441 filed on Jun. 15, 2006.

BACKGROUND OF THE INVENTION

1. Field of the Invention

The present invention relates generally to a method and apparatus for automated play of lottery games.

2. Description of Related Art

A purchase of a lottery ticket typically requires a visit to an authorized lottery agent, where the process varies depending on the type of game to be played. Commonly-known games include "instant" tickets, or "scratch" tickets, where the winning status is apparent on the face of the ticket, and "Lotto" games, where the player picks or otherwise receives a set of entry numbers, and the status of the numbers is determined by comparison with numbers selected in a subsequent lottery drawing.

With respect to "scratch-off"-style instant lottery games, a player typically purchases a paper or cardboard game ticket from a participating lottery agent. In the case of most instant lottery games, the player then reveals combinations of symbols or values by physically uncovering a portion of the game ticket that is concealed by a covering material, such as latex. Certain revealed combinations of symbols or values may correspond to prizes, which may be provided to a player at a participating lottery agent.

Thus, once a player purchases a ticket, an outcome corresponding to the ticket may immediately be determined, and any resultant prize may then be claimed. The ability of the instant lottery player to determine immediately upon purchase, or at his convenience, contributes to the appeal of instant lottery games.

The typical requirements of travel to a lottery agent and/or physical play of the ticket, however, may be a hardship on a player. Further, a potential player may decide not to purchase a lottery ticket because of these requirements, or may decide to purchase a lesser number of lottery tickets than desired. In addition, the overall cost associated with the production and distribution of physical game tickets makes it prohibitive to offer instant tickets for sale below a certain price point, such as one dollar ($1.00).

Limited options have been made available whereby lottery tickets may be purchased without visits to a lottery agent. Some lotteries now offer subscription sales of "Lotto"-type lottery tickets. With a subscription ticket, lottery entries are automatically re-entered into drawings for a predefined number of weeks. Such subscription tickets are often made available at a discounted price. The Vermont State Lottery, for example, offers multiple drawing "contracts," or a subscription, whereby a player can enter selected numbers in multiple drawings.

Commonly-owned U.S. Pat. No. 5,871,398, "OFF-LINE REMOTE SYSTEM FOR LOTTERIES AND GAMES OF SKILL", issued to Schneier, et al. (hereinafter "the '398 patent"), describes systems and methods for the electronic representation of instant lottery games via an electronic handheld ticket viewer (HTV). As described in the '398 patent, the HTV may comprise a personal digital assistant (PDA) or other electronic device (e.g., a personal computer) having hardware and/or software means operable to facilitate the methods described therein.

The game of Keno resembles automated game play. A game of Keno consists of matching a series of player-selected numbers against a series of numbers drawn by the Keno system. Once the player has selected the series of numbers, the player selects a certain number of games for which those numbers are valid. Thus, by selecting several games, the player may bet on future games without further interaction with the system.

Despite proceeding without interaction between the player and the Keno system, there is no automated play for a particular customer in Keno. For example, the numbers are drawn by the system and broadcast or transmitted to a number of screens throughout an establishment, such as a casino. Thus, the establishment determines how and when the outcomes of Keno games are provided to players. Furthermore, the Keno games continue indefinitely, without regard to either (i) a particular player's status, (ii) a particular player's participation, or (iii) the outcome of a prior game. Thus, while the drawing of numbers in Keno may occur in a continuous manner, there is no automated play for a particular customer.

SUMMARY OF THE INVENTION

A method according to one embodiment of the present invention provides for: receiving data indicating a request by a player for an automated session, in which the automated session comprises a plurality of lottery outcomes; determining at least one parameter associated with the automated session; determining at least one lottery outcome; and providing the at least one lottery outcome based on the at least one parameter.

BRIEF DESCRIPTION OF THE DRAWINGS

FIG. 5 is a schematic view of the player database of FIG. 3;

FIG. 7 is a schematic view of the communication device database of FIG. 3;

DETAILED DESCRIPTION OF PREFERRED EMBODIMENTS

Figure 1A:
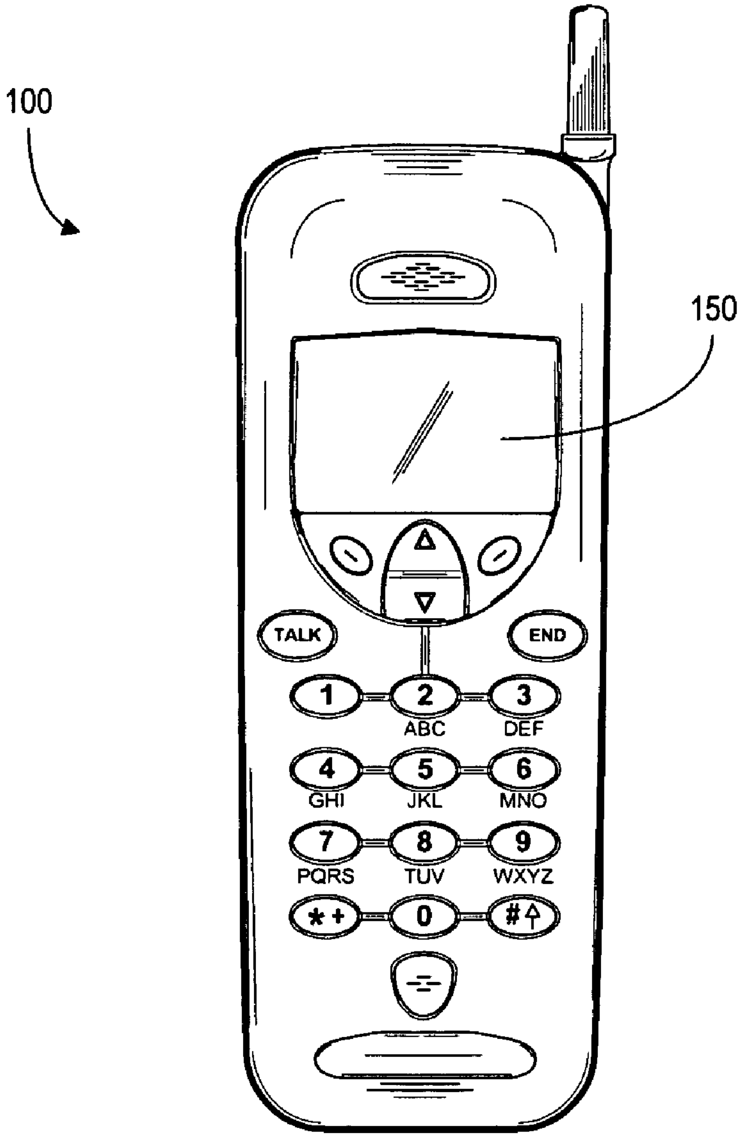
FIG. 1A is a schematic view of a player communication device.

Various embodiments of the present invention provide a method and apparatus for automated play of lottery games. According to an exemplary process, a player communication device and a lottery server are in communication with each other. Either the player communication device or the lottery server (or a combination thereof) performs a method of determining an automated play parameter associated with a player, and providing lottery information in accordance with the automated play parameter. In this way, a player may enjoy automated play of a lottery game (or games).

Various embodiments of the present invention include a lottery server operable to receive a limiting criterion of play, initiate automated play of a lottery game, and terminate automated play of the lottery game upon occurrence of the limiting criterion. In another embodiment of the present invention, the automated play of the lottery game includes repetitive play of the lottery game.

In many instances, the limiting criteria will be the use of the moneys initially authorized for play, e.g., when an account associated with the automated play mode runs out of money. The present invention further provides a method and apparatus for notifying a player when available credit is running low, permitting a player to increase the balance of an account, or to remotely authorize further funds for continued play.

A method according to other various embodiments of the present invention includes the step of initiating automated play at a player device. In such embodiments, automated play of the player device may occur when the player device is unattended by a player.

According to other various embodiments, the method includes the steps of receiving a play option and automatically playing a lottery game according to the play option.

The present invention also includes a lottery server which includes a memory device having a player parameter selection stored therein and a processor in communication with the memory device. The processor is configured to initiate automated play of a lottery game until occurrence of a limiting criterion of play.

Various embodiments of the present invention provide for determining an outcome of an automated play session that requires a decision by the player in order to determine a further outcome or a payout, and then holding the outcome for a later decision by the player. Alternatively, the outcome requiring a decision may be determined in accordance with a parameter associated with the automated play session.

Various embodiments of the present invention provide for maintaining an audit trail for a lottery server and the outcomes of lottery games.

The present invention is directed generally to automated play of lottery games. In various embodiments, a player provides player identifying information and player parameter selections to a lottery server. The lottery server stores the player parameter selections and proceeds to initiate automated play of a lottery game or of multiple lottery games.

According to various embodiments, the player identifying information and player parameter selections may be entered at a player communication device. The player communication device may store the information and selections and/or transmit the information and selections to a lottery server. According to various embodiments, the player communication device may initiate automated play.

Such automated play may occur while the player communication device is unattended by the player. Remote communications with the player permit the player engaged in automated play both to enjoy the ongoing play, and to alter any pre-established, limiting criteria, for example relating to funding, by making appropriate adjustments during the course of automated play. In various embodiments of the present invention, such adjustments may be made via a communication device. Some limitations may also be altered remotely, through a telephone call or appropriate communication to the lottery server or, for example, to personnel operating the lottery server. The automated play session ends upon occurrence of a limiting criterion or upon the termination of the automated play session by the player.

With reference to FIG. 1A, a cellular telephone 100 according to one exemplary embodiment of the present invention is shown. The telephone 100 has a game display 150 capable of displaying lottery information.

Figure 1B:
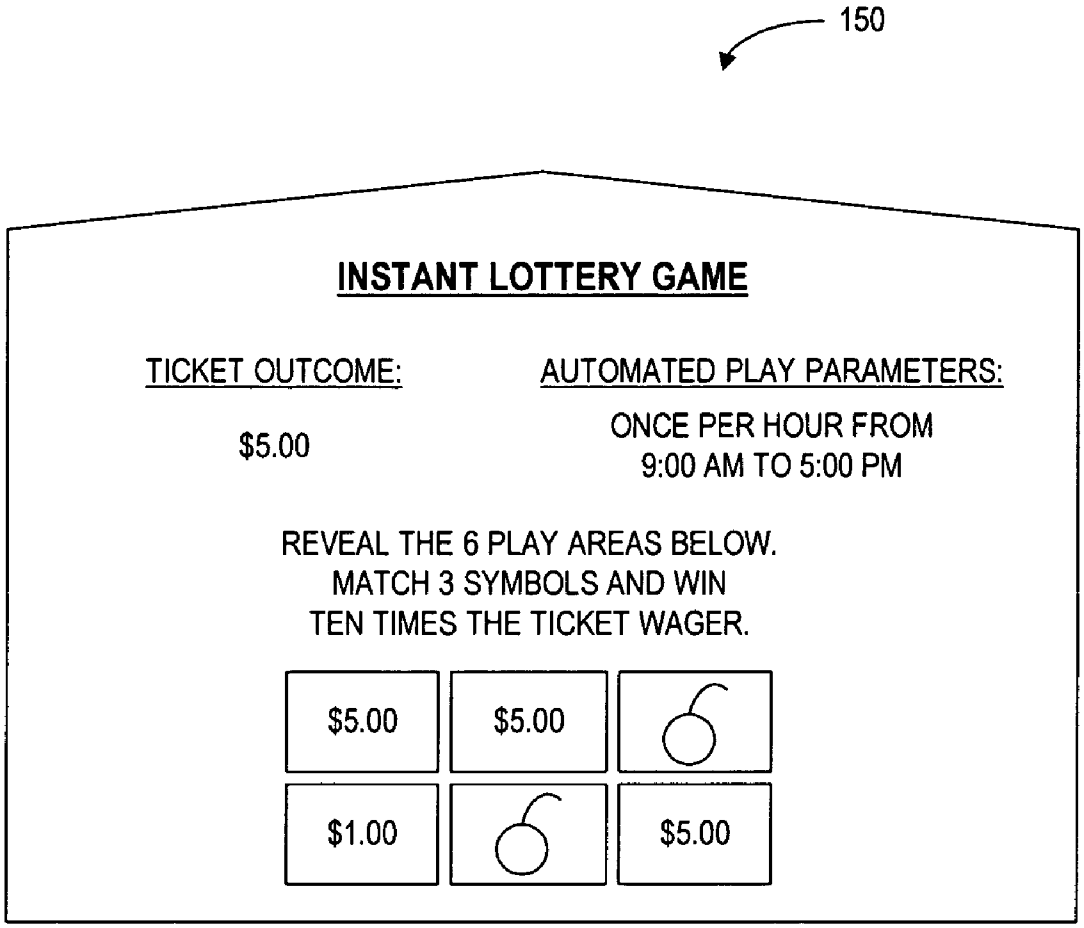
FIG. 1B is a schematic view of a graphical display of the player communication device of FIG. 1A.

With reference to FIG. 1B, the game display 150 depicts an example of an instant lottery game. A player playing the instant lottery game is instructed to reveal the six play areas displayed. If three winning amounts are matched, the player wins that amount (e.g., the instant lottery game shown in FIG. 1B results in a ticket outcome of $5.00). The game display 150 indicates that the player has arranged to have one instant lottery game automatically delivered each hour from 9:00 AM to 5:00 PM (e.g., without further input or request from the player) via his cellular telephone 100.

The play areas may be revealed in response to the player's input, for example, by using the keypad of the cellular telephone 100, or, alternatively, by voice command. Alternatively, the play areas may be revealed automatically by the cellular telephone 100. According to one embodiment, the cellular telephone may reveal the play areas automatically in response to a signal from a lottery server.

Figure 2:
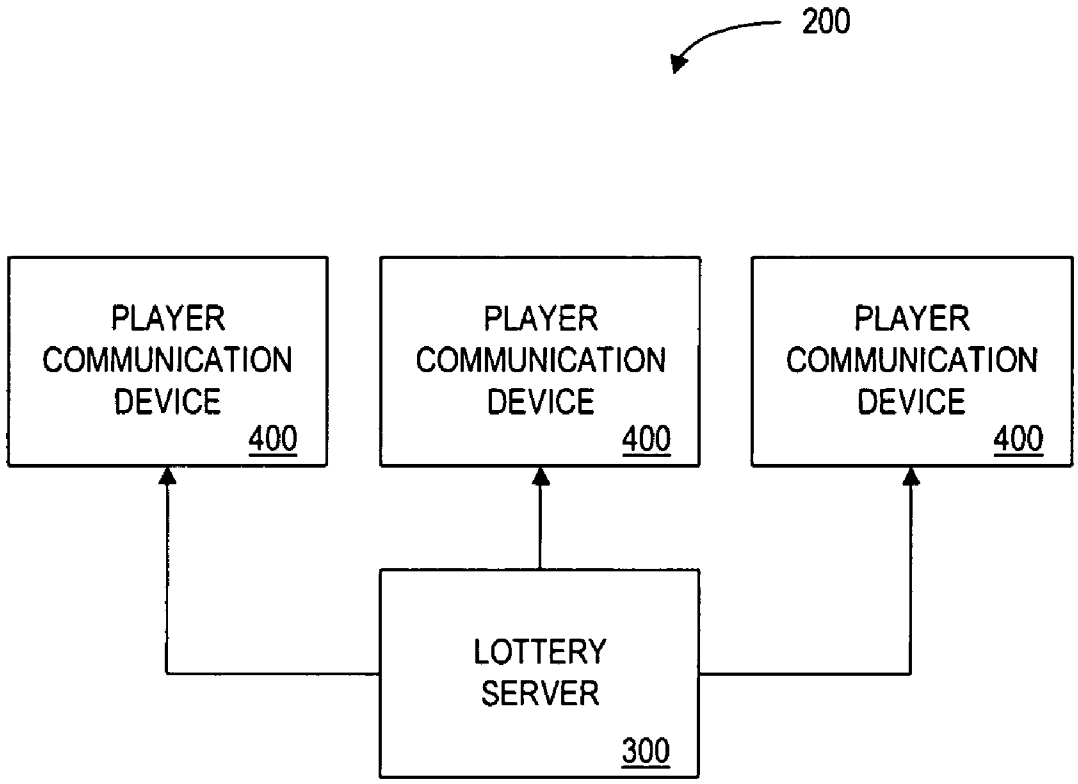
FIG. 2 is an overall schematic view of a system according to one embodiment of the present invention, including a lottery server and a player communication device.

With reference to FIG. 2, a system 200 according to one embodiment of the present invention is shown. In general, the system 200 comprises a lottery server 300 in communication with a plurality of player communication devices 400. Communication device 400 (e.g., a pager, personal computer, handheld display device, PDA, set-top display device, or cellular telephone including a display) provides sufficient information to permit the player to follow and enjoy the play, and in some cases to authorize necessary or desired changes in the play.

As will be described in greater detail below, the player communication device 400 may be used to communicate player identifying information and player parameter selections to the lottery server 300. The lottery server 300 may comprise a computer device, such as a Web server, operated on behalf of or, in conjunction with, a lottery authority. The lottery server 300 determines lottery outcome data and communicates instructions and lottery information, including the lottery outcome data, to the player communication device (or communication devices) 400.

Communications between the lottery server 300 and the player communication devices 400 may be facilitated by way of a computer network, such as the World Wide Web, the Internet, local area network, postal mail, or any combination thereof. In accordance with the present invention, a plurality of player communication devices 400 may be located remotely from the lottery server 300, for example, at a home of a player or at a lottery agent.

Figure 3:
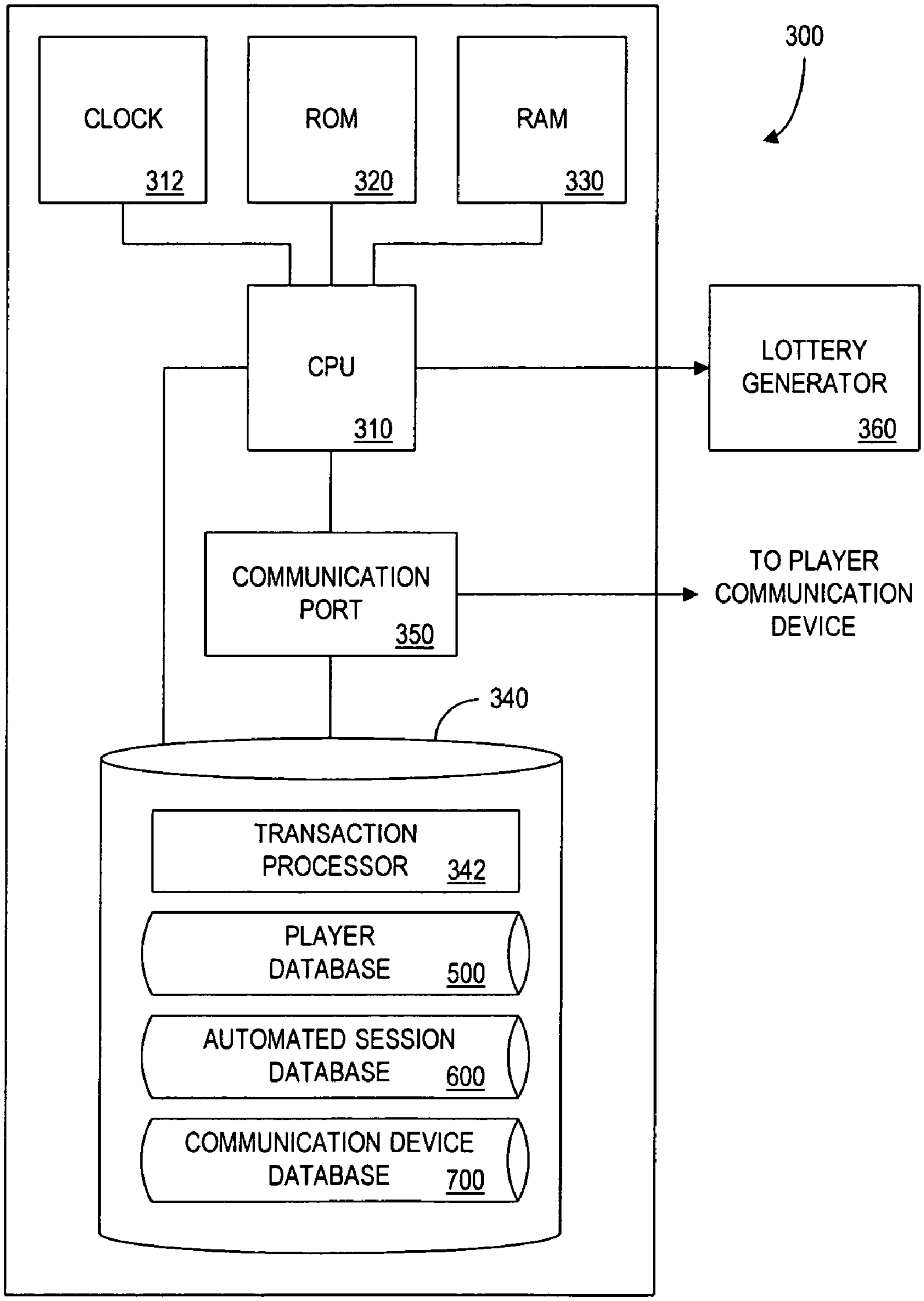
FIG. 3 is a schematic view of the lottery server of FIG. 2, including a player database, an automated session database and a communication device database.

With reference to FIG. 3, the lottery server 300 will be described in greater detail. Lottery server 300 may comprise any computing device operable to execute electronically represented instant lottery games in accordance with the methods of the present invention. Lottery server 300 has a Central Processing Unit (CPU) 310. The CPU 310, which has a clock 312 associated therewith, executes instructions of a program stored in Read Only Memory (ROM) 320. During execution of the program instructions, the CPU 310 temporarily stores information in the Random Access Memory (RAM) 330.

Additionally, the CPU 310 is coupled to a data storage device 340, having a transaction processor 342, a player database 500, an automated session database 600 and a communication device database 700. In general, the transaction processor 342 manages the contents of the data storage device 340. As discussed in detail below, the player database 500, automated session database 600 and the communication device database 700 store information related to player identification, automated lottery game play and remote communication to the player's communication device 400, respectively.

In order to communicate with the communication device 400, the lottery server 300 also includes a communication port 350. The communication port 350 is coupled to both the CPU 310 and the data storage device 340. Thus, the CPU 310 can control the communication port 350 to receive information from the data storage device 340 and transmit the information to the player communication device 400. Information may also be received from the player communication device 400 via communication port 350. Note that the communication path between the communication port 350 and the communication device 400 need not be hardwired. As noted above, the communication device 400 is preferably a personal computer, a pager, a handheld device including a display (e.g., such as a PDA), or a cellular telephone, and preferably employs wireless communication.

Lastly, also in communication with the CPU 310 is a Random Number Generator (RNG) 360. Under control of a program stored, for example, in storage device 340 or ROM 320, the CPU 310 initiates the RNG 360 to generate a random number. Alternatively, the CPU 310 may be controlled by, or responsive to, for example, a signal from the player communication device 400.

The CPU 310 looks up the generated random number in a stored table 382 and finds the corresponding outcome. Based on the identified outcome, the CPU 310 locates the appropriate payout in a stored payout table 384. Alternatively, the CPU may determine the payout based directly upon the generated random number.

Figure 4:
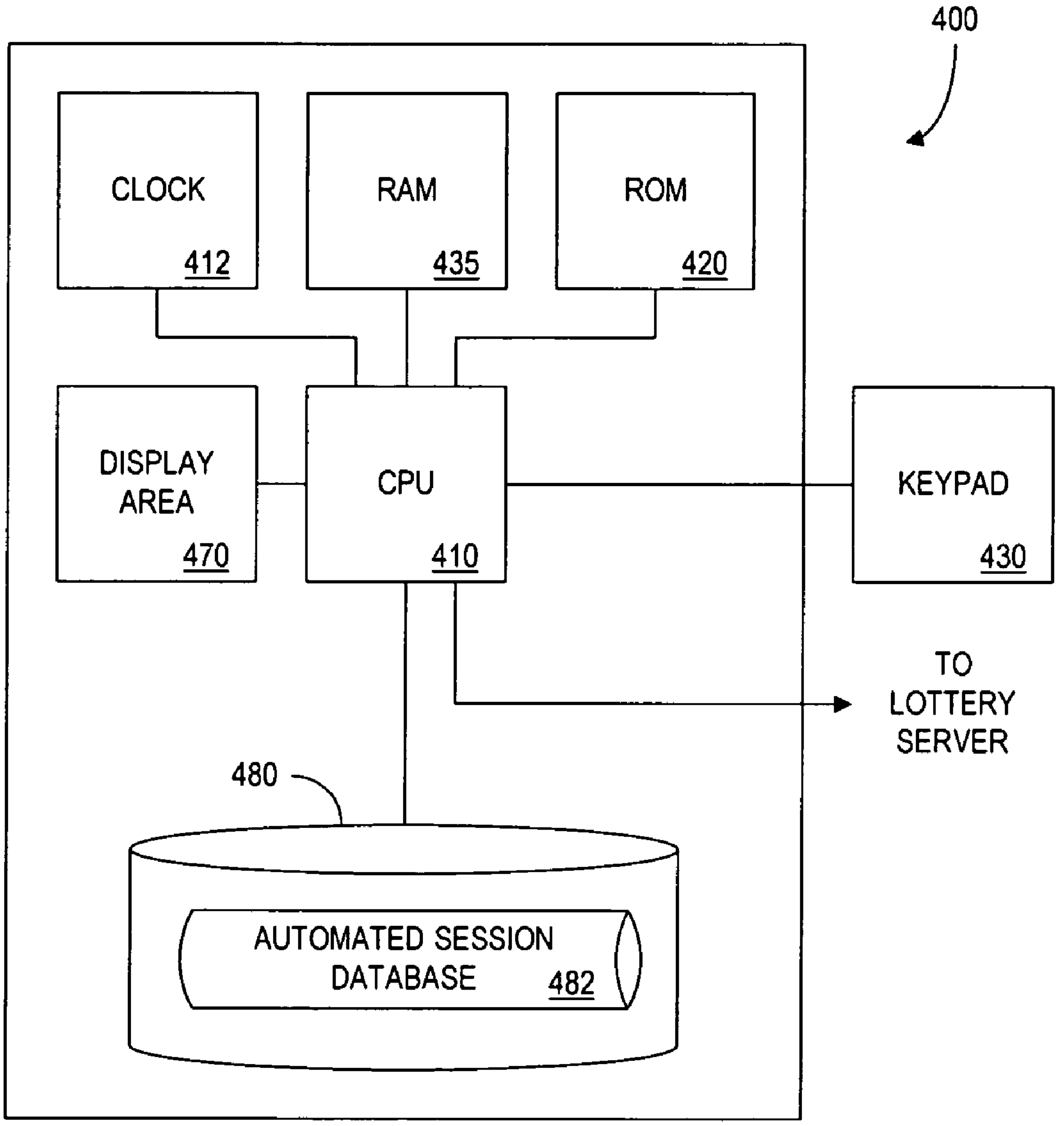
FIG. 4 is a schematic view of the player communication device of FIG. 2.

With reference to FIG. 4, the player communication device 400 contains a Central Processing Unit (CPU) 410 and a clock 412. The CPU 410 may execute instructions of a program stored in Read Only Memory (ROM) 420.

The player communication device 400 also includes a display area 470 and a keypad 430. In operation, as discussed below, the player communication device 400 may display a message prompting the player to enter player parameter selections. In the present embodiment, the player enters the player parameter selections via the keypad 430. In an alternative embodiment, a player enters the player parameter selections via the display area 470, which may include a touch screen.

With respect to gaming operations, under control of a program stored (e.g., in a storage device 480 or ROM 420) the CPU 410 may determine an automated play parameter associated with the player. For example, the player may input an indication of an automated player parameter, or, alternatively, the player communication device may store an indication of the automated player parameter in, for example, storage device 480. Then, the player communication device 400 may provide lottery information in accordance with the automated play parameter. For example, as discussed in greater detail below, a sequence of lottery outcome data may be received from lottery server 300 and stored, for example, in storage device 480. Player communication device 400 may then display lottery information in accordance with the automated play parameter, for example, revealing a game (or game result) once every hour. Alternatively, the CPU 410 may be controlled by, or responsive to, for example, a stored program or a signal from the lottery server 300. Thus, information and instructions may be communicated among the lottery server 300 and player communication device 400.

The player database 500 of the present embodiment as shown in FIG. 5, includes multiple records having multiple fields of information. Specifically, the player database 500 comprises multiple records, each record being associated with a particular player, as identified by a player identification (ID) code. The fields within each record include: name 510, social security number 520, player ID 530, address 540, telephone number 550, credit card number 560 and credit balance 570. Thus, having information related to one field, such as player ID 530, allows the lottery server 300 to retrieve or access further information stored in the other fields of that player's record.

It is to be understood that not all of these identifying fields, nor the illustrated design of the player database 500, are necessary for operation of the present embodiment. Specifically, the name 510, social security number 520, player ID 530, address 540, telephone number 550 and credit card number 560 fields are merely representative of additional information that may be stored and used for other purposes. For example, in an alternative embodiment, credit card number 560 is used for billing purposes and social security number 520 is used to generate tax forms when a player wins a payout over a given amount.

Thus, in the present embodiment, only the player's name 510, player ID 530 and credit balance 570 are necessary.

Figure 6:
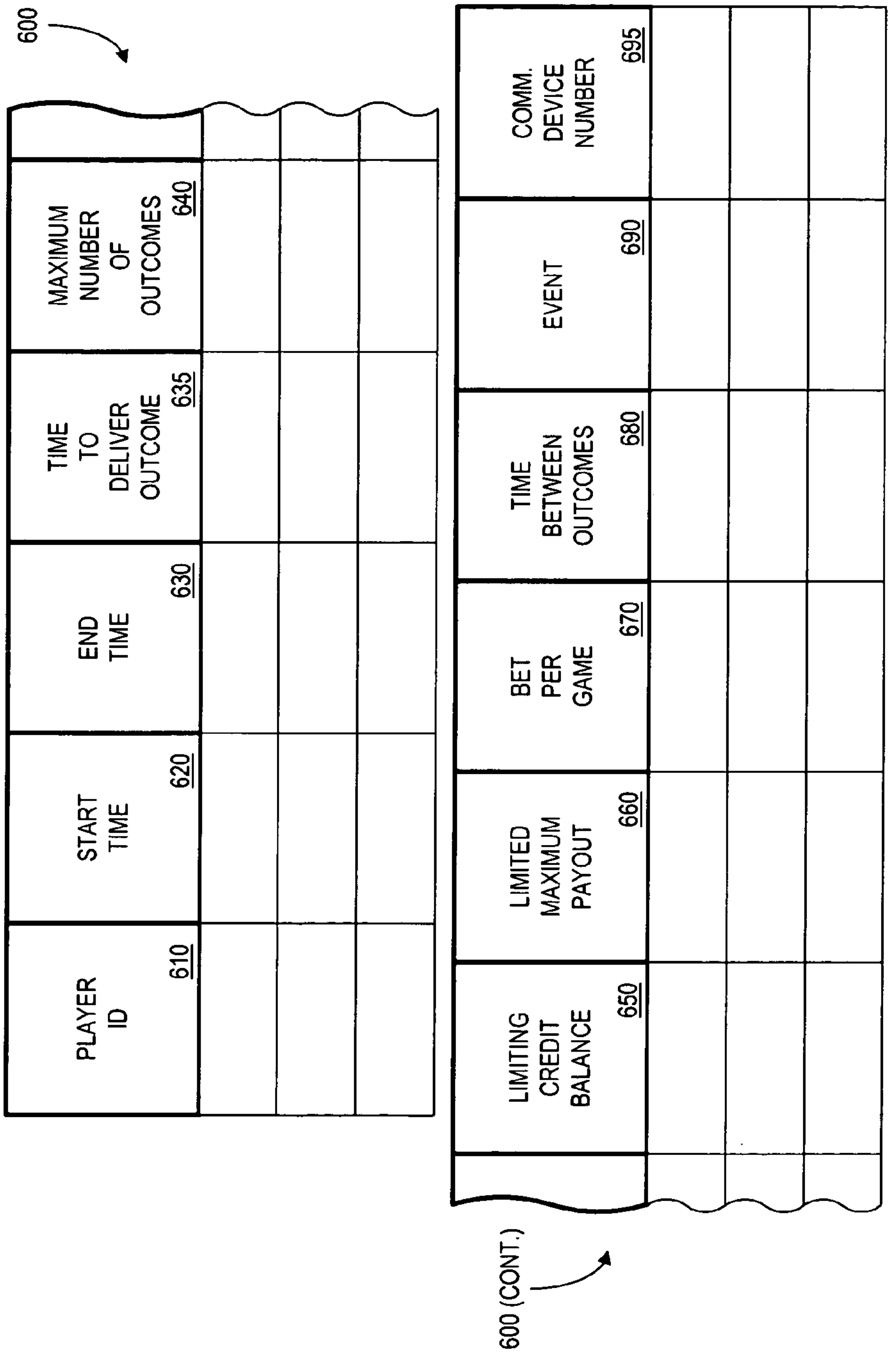
FIG. 6 is a schematic view of the automated session database of FIG. 3.

The automated session database 600, as shown in FIG. 6, comprises multiple records, each record pertaining to an automated play session of a particular player, as identified by the player ID. Consequently, one field in each record is the player ID field 610. Other fields include: start time 620, end time 630, time to deliver outcome 635, maximum number of games 640, limiting credit balance 650, limiting maximum payout 660, bet per game 670, time between games 680, event 690 and communication device number 695. As will be apparent to one of ordinary skill in the art, since both the player database 500 and the automated session database 600 include a player ID field, 530 and 610, respectively, the system 200 can correlate any information stored in the player database 500, corresponding to a particular player, with any information stored in the automated session database 600, corresponding to that same player.

The communication device database 700, as shown in FIG. 7, includes multiple records, each record pertaining to a different communication device 400 as identified by a communication device number as stored in the communication device number field 710. The additional fields in each record include communicator identifier 720, player ID 730, communicator time out 740, and communicator time in 750. Because the communication device database 700 and the automated session database 600 both include a communication device number field 720, 695, respectively, information can be correlated between the two databases.

Furthermore, because the communication device database 700, like the automated session database 600 and the player database 500, contains a player ID field 730, the system 200 can correlate information contained within these three databases 500, 600, 700 for a particular player, as identified by the player ID.

In one embodiment of the present invention, the information stored in the communication device database 700 is used to inventory the communication devices 400. The communication time out 740 represents the time at which a player received a communication device 400 from, for example, a lottery agent, and the communicator time in 750 represents the time the communication device 400 was returned to, for example, the lottery agent. Having such information, the lottery server 300 may, at any given time, search the communication device database 700 and determine which communication devices 400 are presently in use. Furthermore, for any communication device 400 that has been out for more than a given period, the lottery server 300 may determine which player, based upon the player ID number in field 730, last used the device 400. Moreover, based on the player ID number, the server 300 can obtain the information necessary to contact that player from that player's record in the player database 500.

As will be understood by those skilled in the art, the ultimate goal of most lottery players is to hit a payout. The enjoyment of the play, as well as the ability to maximize the chance of hitting a large payout, is increased by more play. Play can be increased both by playing longer, and by playing faster. As will be appreciated from a consideration of the process described below, the present invention permits both increased duration and speed of play. The operation of the system 200 will now be described in greater detail with reference to automated play process 800 of FIGS. 8A and 8B, and continuing reference to FIGS. 1-7. It is to be understood that the programs stored in ROM 320 of the lottery server 300 and ROM 420 of the player communication device 400 provide the functions described below.

As shown at step 805, the lottery player first activates player communication device 400. Player communication device 400 then proceeds to determine player identifier information. Player identifier information may be stored, for example, in storage device 480. Alternatively, the player may input the player identifier information. Typically, the player identifier information, namely the player's name and the player ID, are communicated from the player communication device 400 to the lottery server 300. In other embodiments, the player communication device 400 may simply transmit its communication device number to lottery server 300. The lottery server 300 may then retrieve player identifier information by referencing the communication device number field 710 of the player communication device database 700 and determining the corresponding player ID 730.

Upon receiving the player identifying information, the lottery server 300 authenticates the information. This step, depicted as step 810, includes the lottery server 300 searching the player database 500 for a record containing the player name and player ID received in the appropriate fields 510 and 530, respectively. Once the lottery server 300 authenticates the player identifying information, the server 300 transmits a signal to the player communication device 400 acknowledging such authentication.

In step 815, the player chooses to select automated lottery play. According to various embodiments of the present invention, the player may choose to select automated lottery play after receiving an offer of a reward in exchange for the player participating in an automated play session. A reward might be, for example, a bonus payout, a higher payout schedule, a gift certificate, free plays, or the like.

The player communication device 400 also prompts the player to authorize funds for use during the automated play session. Specifically, as shown in step 530, the player uses player communication device 400 to authorize an amount of funds for lottery play by, for example, providing a credit card number and the amount of funds the player wishes to have credited to his game account. The player communication device 400 then transmits a signal to the lottery server 300 indicating the credit card number and/or the amount of funds deposited by the player. In response, the lottery server 300 accesses the record in the player database 500 corresponding to the particular player and increments the credit balance field 3500 in accordance with the amount of funds deposited.

In yet another alternative embodiment, the player, prior to initiating an automated play session, deposits a certain amount of funds at a lottery agent. The lottery agent accesses the record in the player database 500 corresponding to the player's ID. The cashier then increments the credit balance field 570 by the amount of funds just deposited.

In step 820 the remote player enters the player parameter selections. More specifically, the lottery server 300 transmits a signal to the player communication device 400 causing the player communication device 400 to display a prompt on the display 420 requesting that the player enter the player parameter selections. As noted above, the player preferably enters the player parameter selections via keypad 430. In an alternative embodiment, the player enters the player parameter selection via the touch screen on the display 420. In yet another alternative embodiment, the player parameter selections are previously stored in a record in the automated session database 600 as identified by the particular player's player ID in field 510. Alternatively, the player may enter the player parameter selections via voice commands to communication device 400.

Player parameter selections include both play options and limiting criteria of play. Play options, as used herein, include any information used to define automated play. In the present embodiment, play options include the bet per game and time between games, as stored in fields 670 and 680 of the automated session database 600. Other play options may include, for example, the type(s) of lottery game(s) to be played, a time for an outcome to be provided, or an event that triggers the provision of an outcome. For example, a player might request an automated play session including only games which had produced the most (or, alternatively, the fewest) wins in the last hour.

Play options may be used by the player communication device 400 or by the lottery server 300 to determine how the player wants the lottery information delivered. For example, a player may desire an electronic "scratch-off" type lottery ticket to be delivered to the payer via e-mail once per hour during the workday. According to another embodiment, the player communication device 400 or the lottery server 300 may automatically play the lottery ticket for the player, e.g., by revealing or otherwise determining an outcome of the electronic ticket.

A limiting criterion, on the other hand, is any information that may define the beginning or end of an automated play session. In the present embodiment, limiting criteria include: start time, end time, requested number of games, credit balance, total losses, total winnings, and limiting maximum payout. By definition, the expiration of all available credits/ funding for playing will, unless other arrangements are made in advance with the lottery authority, constitutes a limiting criterion of play. Similarly, the player may define a specific winning credit value as a limiting criterion of play (e.g., stop playing if a credit of one thousand dollars is ever registered).

Once the player communication device 400 receives the player preference selections, the player communication device 400 transmits the information to lottery server 300. The lottery server 300, as shown in step 830, proceeds to store the player parameter selections in the appropriate fields in the automated session database 600.

In addition to storing the player parameter selections, the lottery server 300 assigns an address in RAM 330 to keep current totals of actual limiting values. An actual limiting value is a value that corresponds to a limiting criterion of play. More specifically, an actual limiting value is the actual, current total of a criterion value necessary to determine whether any of the limiting criteria of play have occurred.

Thus, in the present embodiment, the lottery server 300 assigns an address in RAM 330 to store the number of outcomes that actually occur during automated play. Additionally, the server 300 assigns an address in RAM 330 to store the actual amount of losses or winnings during automated play. Both the actual number of outcomes and the actual amount of winnings or losses may be actual limiting values.

Furthermore, the current credit balance, which is stored in RAM 330, may also be an actual limiting value. As described below with reference to steps 845, 850 and 860, these actual limiting values are updated during automated play and used to determine whether a limiting criterion has occurred.

The lottery server 300 may also assign an address in RAM 330 to store a time value corresponding to the play option of time between games 580.

Next, in step 835, the automated play session commences. In one embodiment of the present invention, the commencement of automated play includes the lottery server 300 transmitting locking data to the player communication device 400. The locking data may be a signal that prevents a player from initiating a manual play of the player communication device 400.

The lottery server 300 need not transmit locking data. If so, player communication device 400 is not locked and may be used by any player (including the player for whom automated play has commenced).

Automated play may commence in various ways. The server 300 may initiate automated play of a lottery game (or games), as shown in step 840, if the player has entered a start time 530 as a player parameter selection. Specifically, the lottery server 300 searches the automated session database 600 and compares the time from the clock 312 to the values stored in the start time field 530 and the end time field 540. If the internal clock time is equal to or greater than the value stored in the start time field 530 and less than the value stored in the end time field 540 (if such a value exists), then the lottery server 300 initiates automated play.

Alternatively, the player may choose to begin automated play immediately upon entering the player parameter selections other than a start time 530.

In step 845, the lottery server 300, having determined outcome data, as described above with respect to various embodiments, transmits the outcome data to the player communication device 400.

Outcome data, as used herein, means any information describing the outcome of a game. In the present embodiment, outcome data includes a combination of numbers and/or values as well as the corresponding payout or loss for a given play.

According to various embodiments of the present invention, once the lottery server 300 determines the outcome data, it accesses the automated session database 600 to determine the bet per game 560 for the particular player. Lastly, the lottery server 300 accesses the player database 500 to update the credit balance field 580 in the player's record. The credit balance field 580 is decreased by the bet per game amount and increased by the payout, if any.

In various embodiments, lottery server 300 stores outcome data in conjunction with information identifying the player associated with the outcome. This allows subsequent audits to account for the fact that although one outcome was generated a corresponding revenue stream may be associated with two players. Alternatively, lottery server 300 may store the above information without the identities.

Once the lottery server 300 receives the outcome data, the server 300 also updates the actual limiting criteria stored in RAM 330, as needed. Specifically, the number of games value is incremented by one and the total losses/winnings value is changed to reflect the results of the last game.

In various embodiments of the present invention, the server 300 also stores the time it proceeds to step 855, as indicated by clock 312, as the time value corresponding to the time between games 580. The server 300 uses this time value to determine the speed of play. Each subsequent time the system 200 performs the operations of step 850, the server 300 also determines whether, in light of the time between games 580, it must delay before continuing to proceed. Specifically, the server 300 retrieves the time between games 580 and the previously stored time value. The server only proceeds to step 855 when the current time, as indicated by the clock 312, equals the sum of the time between games 580 and the previously stored time value. The server 300 stores the time it proceeds to step 855 as the new time value.

It is anticipated that a player having only a limited time remaining at a lottery retail location and a small amount of funds available will enter the minimum allowed time (e.g., "zero") as the time between games 580. If such a value is received, the system 200 proceeds to continuously generate outcome data without delay, or with a minimal amount of time between generated outcomes, until a limiting criterion of play occurs. For example, the player enters the minimum allowed time as the time between games 580 in step 825 and likely remains at the player communication device 400 to watch the player communication device 400 rapidly display game after game until, for example, the player is out of funds or wins a payout.

In various alternative embodiments of the present invention, the lottery server 300 compares generated outcome data with a player's session parameters to determine if the game corresponding to the generated outcome data should be included as a game in the player's automated play session. For example, a player may choose to include all games from a particular type of lottery game in his automated play session.

Once the lottery server 300 receives the outcome data and updates the databases, the server 300 transmits the results of the play to the remote player communication device 400. The results communicated in step 855 to the player communication device 400 may include the determined sequence of numbers or values, the payout of a particular game, the player's current credit balance 570, and any other information stored or generated by the system 200.

Alternatively, the results may be stored by the server 300 and communicated, for example, at a specific time, periodically, upon the player's request, or in accordance with a player's selection parameters. Similarly, the results, once received by the communication device 400, may be stored and displayed, for example, at a specific time, periodically, upon the player's request, or in accordance with a player's selection parameters.

According to one embodiment, the lottery server 300 may determine an outcome sequence, for example, in accordance with a player parameter or in response to a player request. The lottery server 300 then provides the outcome sequence to the player communication device 400. The lottery server 300 may provide an outcome sequence that may be played by the player (or automatically by the player communication device 400) over the course of several game sessions. For example, the lottery server 300 may transmit and store a predetermined number of outcomes at the player communication device 400. The player may then reveal the set of outcomes manually at the player communication device 400, or, alternatively, specify that the player communication device 400 display the outcomes in accordance with automated play parameters.

The lottery server 300 establishes communication with the communication device 400 that is associated with the particular player. Specifically, the server 300 accesses the communication device database 700 and searches for the communication device number 710 equal to that stored in the player's record in the automated session database 600 in field 695. The server 300 then uses the communicator identifier 720, which is the pager or cellular telephone number, or the internet protocol (IP) address of a set-top device, to establish communication with the communication device 400.

Note that in various embodiments, more than one communication device 400 may be associated with the particular player. Thus, results may be transmitted to a player's cellular telephone, PDA, pager, and/or other devices, for example, on a player's "buddy list".

As described above, in one embodiment of the invention communication device 400 comprises a pager with a liquid crystal or other type of display. This communication of the outcome data to the player, which may even include a display of the revealed values of an instant lottery ticket on the display, permits a player to enjoy the excitement of the play without a physical presence at a lottery retailer location.

In one aspect of the invention, the remaining credit balance is communicated to the player along with the outcome data. Thus, when a player notes that his play may be terminated because his credit balance is running out, he has the opportunity to supplement the credit balance. The player can increase the credit balance by phoning the lottery authority and authorizing the lottery authority to increase the credit balance. The lottery authority personnel will appropriately enter the additional funds into the correct server database fields. Alternatively, the player may increase the credit balance by sending a command to the lottery server 300, or other device, via, e.g., a two-way pager or touch-tone wireless telephone.

In step 860, having just completed one play, the lottery server 300 determines whether a limiting criterion has occurred. Specifically, in the present embodiment, the lottery server 300 accesses the record in the automated session database 600, as identified by the player's ID 610, to determine whether any one of the limiting criteria have occurred.

The determination of whether any of the limiting criteria have occurred may be made by various comparisons, for example, by comparing any of: 1) the end time 540 to an internal clock of the server 300; 2) the maximum number of games 640 to the actual number of games stored in RAM 330; 3) the current credit balance 570 to the limiting credit balance 660; and 4) the limiting maximum payout 660 to the actual payout. If none of the limiting criteria have occurred, operation of the system 200 proceeds from step 835, once again.

If any one of the limiting criteria has occurred, then, in step 865, the lottery server 300 stops the automated play session and transmits a signal to the communication device 400, thereby notifying the player that the automated session has ended. If the player communication device 400 was locked-up during the automated session, it may remain locked-up until the player returns. In an alternative embodiment, the lottery server 300 also transmits an unlocking signal to the player communication device 400 upon the occurrence of a limiting criterion of play. The unlocking signal indicates to the player communication device 400 that it may allow manual play.

In yet another embodiment, information other than outcome data, such as machine messages, is communicated to the communication device 400. Machine messages, as used herein, include information generated by the lottery server 300 relating to the status of that particular lottery server 300. For example, such a machine message may indicate that the lottery server 300 has stopped functioning properly.

In yet another embodiment of the present invention, limiting criteria of play, actual limiting values, or both, are communicated to the player. For example, the player will be notified of the current credit balance 570 and the limiting credit balance 650, as well as the current number of games, as stored in RAM 330, and the maximum number of games 640 allowed.

Figure 8A:
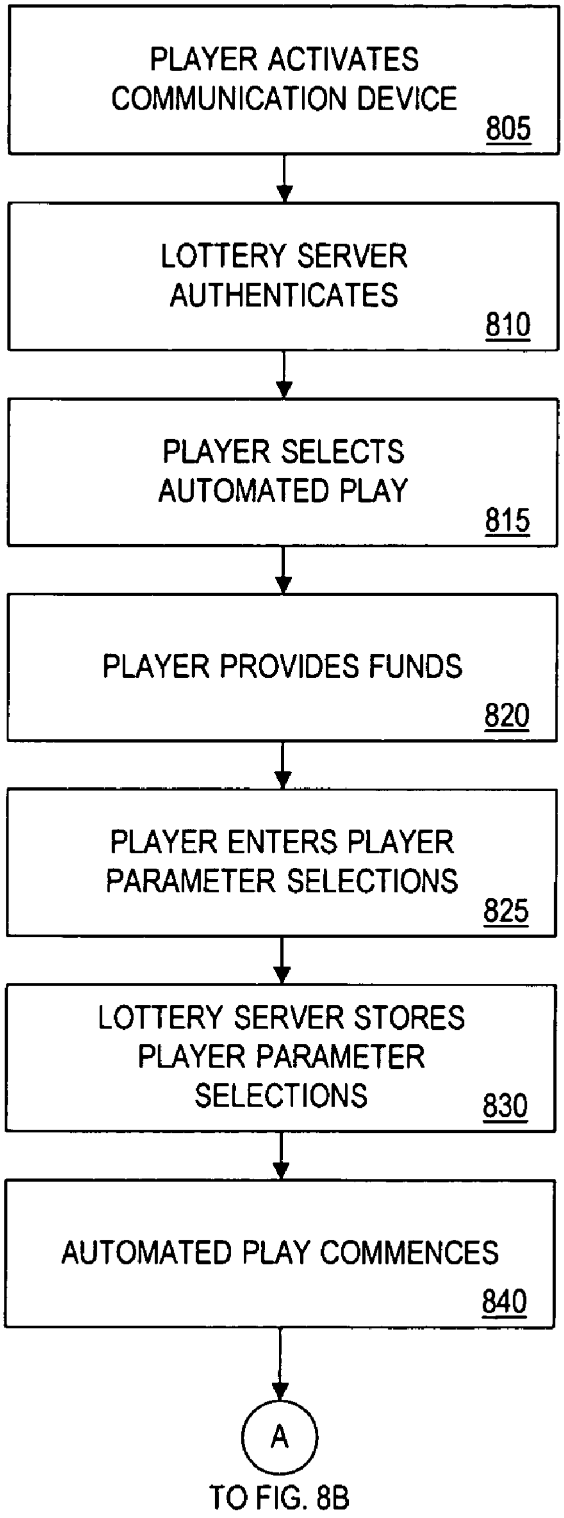
FIGS. 8A and 8B are a flow diagram of the operation of the system of FIG. 2.
Figure 8B:
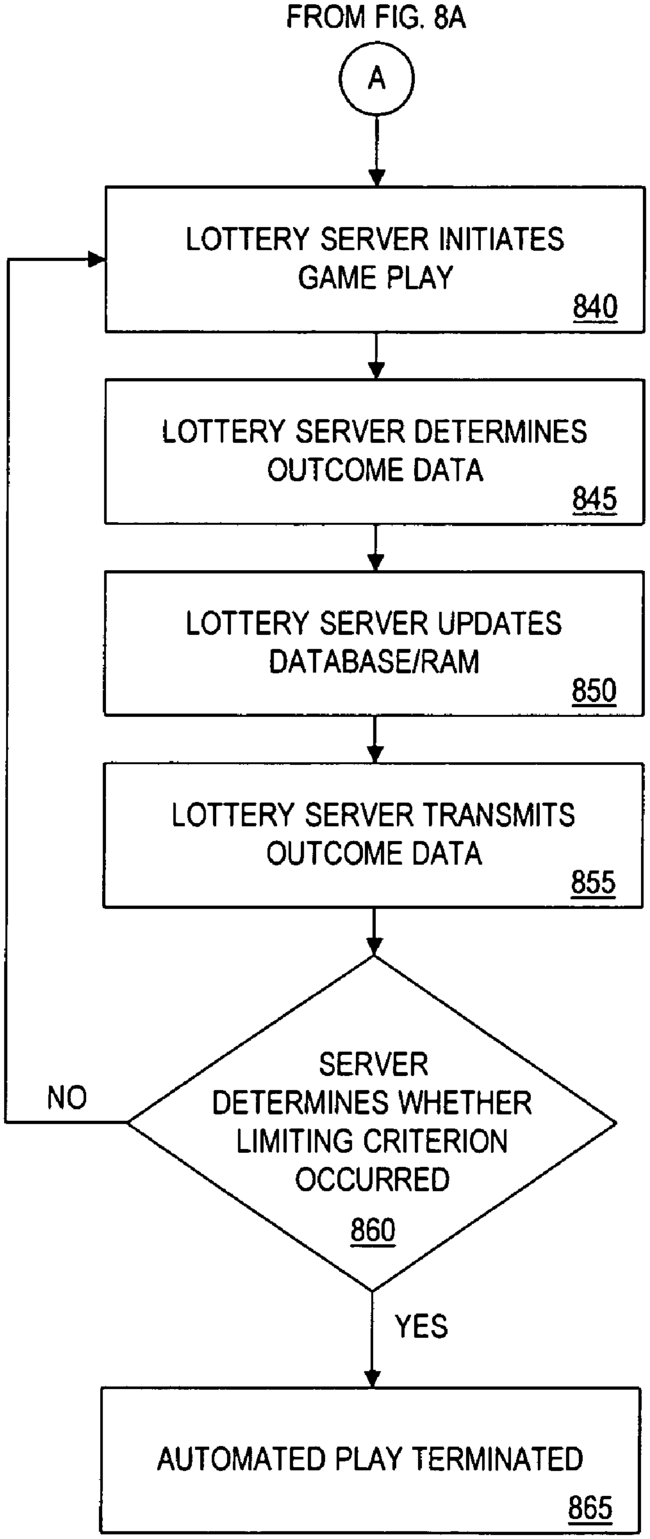

In an alternative embodiment, the outcome data transferred in step 845 of FIG. 8B need only include the payout, if any.

It will be appreciated by those skilled in the art that, while the player may select player parameter selections in the manner described above, the lottery authority may also set guidelines on automated play of lottery games. Thus, the lottery authority may limit the selectable range of player parameter selections, for example the frequency of games, to insure reasonably constant and speedy play. Further, the lottery authority may alter the range of player parameter selections to encourage play during times when the lottery server 300 or the player communication device 400 is otherwise underutilized. For example, the lottery authority may permit a player communication device 400 to be played during late night hours, in an automated mode, at a slower speed and with a higher payout schedule. This would permit a player to start automated play during the nighttime hours when the device 400 would be otherwise unused. The lottery authority would benefit from increased play and revenue, while the player would benefit from potentially better payouts.

Figure 9:
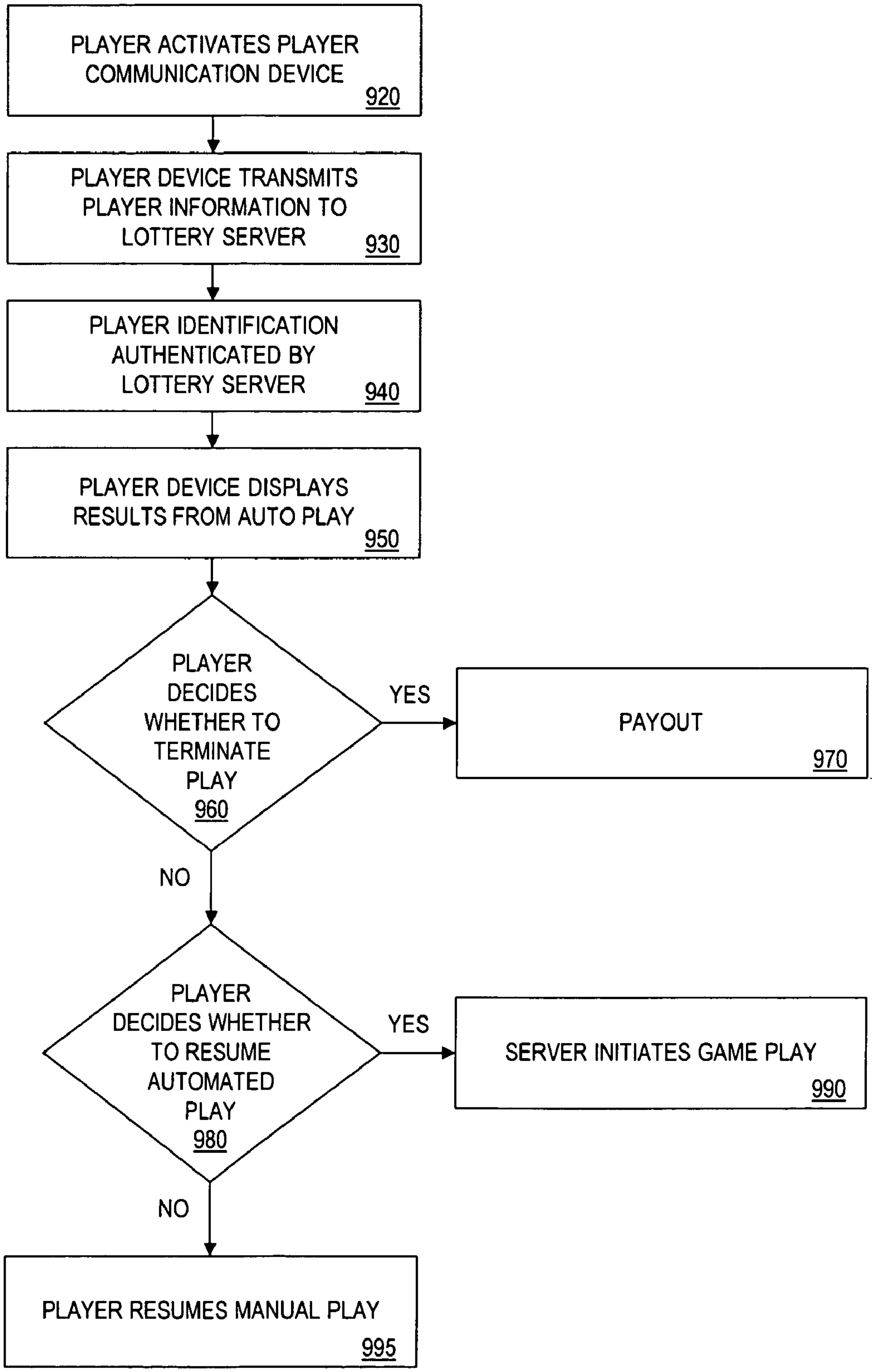
FIG. 9 is a flow diagram of the operation of the system of FIG. 2, illustrating termination of automated play.

At any time during the operation of the system 200, as described with reference to FIGS. 8A and 8B, the player may manually terminate automated play via the player communication device 400. Such manual termination of automated play will now be described with reference to FIG. 9.

The player, in step 920, instructs the player communication device 400 to communicate with the lottery server 300 by, for example, using a button on the keypad 430. The player communication device 400 determines the player identifying information as discussed above and, in step 930, the player communication device 400 transmits this player identifying information to the lottery server 300.

In step 940, the slot network server authenticates the player identifying information. Specifically, the lottery server 300 searches the automated session database 600 to determine whether the player ID number and the communication device ID number just received are also present in a single record in the automated session database 600. If the information is present in a single record in the automated session database 600, the player identifying information is deemed authentic.

In an alternative embodiment, the player may terminate his automated play session via any well-known communication means, e.g., via an Internet website, regardless of whether that particular communication means was used to initiate the automated play. Accordingly, the player identifying information may be deemed authentic if the player ID number is in at least one record in the automated session database 600.

Having authenticated the player identifying information, the lottery server 300 transmits the results from the automated play to the player communication device 400 for display to the player in step 950. The results, which are displayed on display 420 preferably include the player's credit balance 570. The displaying of the results may also include, for example, all of the resulting numbers and/or values or only "highlights" of the winning numbers and values. Having read the results from the automated play session, as shown in step 960, the player may then decide to terminate play. In step 970, if the player decides to terminate play, then the player may receive a payout owed.

It will be understood that, should the player so desire, a complete audit of the automated play session is available. Such an audit would typically be provided by the lottery authority upon special request by the player, and could include a complete reporting of results for every play during the automated session.

On the other hand, if the player decides not to terminate play, then the player must decide whether to resume automated play, as shown in step 980. If the player decides to resume automated play, such play will continue as described with reference to FIG. 8B, steps 840-865, until a limiting criterion occurs or the player returns to manually terminate play. The resumption of automated play is shown as step 990.

As an alternative to resuming automated play, the player may decide instead to resume manual play of the player communication device 400. Step 995 illustrates the resumption of manual play.

As shown in step 970, the player may receive any payout due. The lottery authority may proceed to pay the player any amount less than or equal to the current credit balance 570 stored in the player's record. The personnel then adjust the credit balance 570 to reflect the disbursement.

In another alternative embodiment, the player may receive a prize or reward in lieu of the payout due. Such an offer may be communicated to the player, for example, by the lottery server 300, via the communication device 400. Of course, such an offer may be communicated via the communication device 400 during automated play.

In one embodiment of the present invention, the player communication device 400 may store and update the automated play information, including player identifying information, credit balance, player parameter selections, and actual limiting values, based on lottery information received from lottery server 300.

Furthermore, the present invention encompasses automated play of lottery games that require a player to make decisions during play, such as which game play areas to reveal during an instant lottery ticket game. The inclusion of decision rules in the player parameter selections accounts for the need to make decisions. Alternatively, decision rules may be applied to all players or may be otherwise outside of the control of the player. For example, all players playing an automated play session, or a certain subset of such players, may be forced to play according to a predetermined set of decision rules. Decision rules dictate the course of play based upon the current status of play. In short, because decision rules obviate the need for player decisions, automated play may proceed.

In an alternative embodiment, outcomes requiring a decision by the player may be stored and displayed to the player at a later time via the communication device 400 at the player's request. After the outcome requiring a decision is stored, automated play may then continue with the next game. In accordance with this alternative embodiment, then, automated play could continue without the player's selection. The player could then play all the stored outcomes requiring the player's selection at a later time.

In an alternative embodiment, the player communication device 400 may provide "instant replays" of outcomes of games played during automated play, at the player's request. Replays may comprise all or a portion of the outcomes of the games played.

In an alternative embodiment, a first player could associate his automated play with a second player. In this way, outcomes and/or payouts provided to the second player could be made proportional to outcomes and/or payouts provided to the first player.

There has thus been provided a method and apparatus of operating a lottery game, e.g., an instant lottery ticket game, in an automated manner. The invention further permits a player to enjoy all of the benefits of lottery games, such as the enjoyment of viewing lottery game outcomes, without necessitating a physical presence at a lottery agent or physical play of a "scratch-off"-type lottery game.

Although the present invention has been described in terms of certain preferred embodiments, other embodiments that are apparent to those of ordinary skill in the art are also intended to be within the scope of the present invention. Accordingly, the scope of the present invention is intended to be limited only by the claims appended hereto.

What is claimed is:

1. A method comprising:

determining at least one parameter associated with an automated session, in which the automated session corresponds to a set of instant lottery outcomes;

generating the set of instant lottery outcomes for the automated session based on the at least one parameter;

determining session data based on the set;

after generating all of the instant lottery outcomes of the set of instant lottery outcomes, storing the session data for the automated session;

receiving, by a lottery server, at least one selection by the player for how the stored session data is provided to the player, the at least one selection comprising an indication of a period of time between deliveries of portions of the session data to the player; and providing, by the lottery server, at least a portion of the session data to the player, in accordance with the at least one selection by the player.

2. The method of claim 1, further comprising:

initiating the automated session.

3. The method of claim 1, further comprising:

determining an account associated with the automated session; and crediting the account based on a payout.

4. The method of claim 1, further comprising:

determining a limiting criterion based on the at least one parameter;

determining if the limiting criterion has occurred; and terminating the automated session if the limiting criterion has occurred.

5. The method of claim 1, further comprising:

storing an indication of the set of instant lottery outcomes.

6. The method of claim 5, in which storing comprises:

determining a device associated with the automated session; and storing the indication of the set of instant lottery outcomes at the device.

7. The method of claim 1, further comprising:

receiving a request by the player to purchase the set of instant lottery outcomes.

8. A method comprising:

determining at least one parameter associated with an automated session, in which the automated session corresponds to a set of instant lottery outcomes;

generating the set of instant lottery outcomes for the automated session based on the at least one parameter;

determining session data based on the set;

after generating all of the instant lottery outcomes for the set of instant lottery outcomes, storing the session data for the automated session;

determining, by a lottery server, a device associated with the automated session;

determining, by the lottery server, at least one selection by a player for how the stored session data is provided to the device, the at least one selection comprising an indication of a period of time between deliveries of portions of the session data to the device; and transmitting, by the lottery server, at least one portion of the session data to the device, in accordance with the at least one selection by the player.

9. The method of claim 8, further comprising:

initiating the automated session.

10. The method of claim 8, further comprising:

determining an account associated with the automated session; and crediting the account based on a payout.

11. The method of claim 8, further comprising:

determining a limiting criterion based on the at least one parameter;

determining if the limiting criterion has occurred; and terminating the automated session if the limiting criterion has occurred.

12. The method of claim 8, further comprising:

storing an indication of the set of instant lottery outcomes at the device.

13. The method of claim 8, further comprising:

receiving a request by the player to purchase the set of instant lottery outcomes.

14. A non-transitory computer readable memory storing instructions configured to direct a computing device to perform:

determining at least one parameter associated with an automated session, in which the automated session corresponds to a set of instant lottery outcomes;

generating the set of instant lottery outcomes for the automated session based on the at least one parameter;

determining session data based on the set;

after generating all of the instant lottery outcomes of the set of instant lottery outcomes, storing the session data for the automated session;

receiving, by a lottery server, at least one selection by the player for how the stored session data is provided to the player, the at least one selection comprising an indication of a period of time between deliveries of portions of the session data to the player; and providing, by the lottery server, at least a portion of the session data to the player, in accordance with the at least one selection by the player.

15. The computer readable memory of claim 14, the instructions being further configured to direct the computing device to perform:

initiating the automated session.

16. The computer readable memory of claim 14, the instructions being further configured to direct the computing device to perform:

determining an account associated with the automated session; and crediting the account based on a payout.

17. The computer readable memory of claim 14, the instructions being further configured to direct the computing device to perform:

storing an indication of the set of instant lottery outcomes.

18. The computer readable memory of claim 14, in which storing comprises:

determining a device associated with the automated session; and storing the indication of the set of instant lottery outcomes at the device.

19. The computer readable memory of claim 14, the instructions being further configured to direct the computing device to perform:

receiving a request by the player to purchase the set of instant lottery outcomes.

20. A lottery server comprising:

a processor;

a user interface in communication with the processor; and a storage device in communication with the processor, the storage device storing instructions configured to direct the processor to perform a method, the method comprising:

determining at least one parameter associated with an automated session, in which the automated session corresponds to a set of instant lottery outcomes;

generating the set of instant lottery outcomes for the automated session based on the at least one parameter;

determining session data based on the set;

after generating all of the instant lottery outcomes of the set of instant lottery outcomes, storing the session data for the automated session;

receiving at least one selection by the player for how the stored session data is provided to the player, the at least one selection comprising an indication of a period of time between deliveries of portions of the session data to the player; and providing at least a portion of the session data to the player, in accordance with the at least one selection by the player.

* * * * *